(12) United States Patent
Levine et al.

(10) Patent No.: US 9,105,033 B2
(45) Date of Patent: Aug. 11, 2015

(54) TWO-WAY MARKETING PERSONALIZED DESKTOP APPLICATION

(75) Inventors: Jonathan D. Levine, Rochester, NY (US); George Vigelette, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 731 days.

(21) Appl. No.: 12/690,151

(22) Filed: Jan. 20, 2010

(65) Prior Publication Data

US 2011/0178866 A1 Jul. 21, 2011

(51) Int. Cl.
*G06Q 30/00* (2012.01)
*G06Q 30/02* (2012.01)

(52) U.S. Cl.
CPC ............ *G06Q 30/02* (2013.01); *G06Q 30/0244* (2013.01); *G06Q 30/0246* (2013.01); *G06Q 30/0247* (2013.01); *G06Q 30/0254* (2013.01); *G06Q 30/0255* (2013.01); *G06Q 30/0271* (2013.01); *G06Q 30/0276* (2013.01); *G06Q 30/0241* (2013.01)

(58) Field of Classification Search
CPC .................................. G06Q 30/0241–30/0277
USPC .............................................. 705/14.4–14.73
See application file for complete search history.

(56) References Cited

U.S. PATENT DOCUMENTS

| | | | |
|---|---|---|---|
| 4,359,631 A * | 11/1982 | Lockwood et al. | 235/381 |
| RE32,115 E * | 4/1986 | Lockwood et al. | 235/381 |
| 5,309,355 A * | 5/1994 | Lockwood | 705/6 |
| 5,576,951 A * | 11/1996 | Lockwood | 705/26.62 |
| 5,592,378 A * | 1/1997 | Cameron et al. | 705/26.62 |
| 5,656,834 A * | 8/1997 | Grzyb et al. | 257/207 |
| 5,664,111 A * | 9/1997 | Nahan et al. | 705/26.8 |
| 5,721,832 A * | 2/1998 | Westrope et al. | 705/7.29 |
| 5,778,348 A * | 7/1998 | Manduley et al. | 705/409 |
| 5,832,459 A * | 11/1998 | Cameron et al. | 705/14.4 |
| 5,839,117 A * | 11/1998 | Cameron et al. | 705/27.1 |
| 5,893,075 A * | 4/1999 | Plainfield et al. | 705/14.67 |
| 5,918,398 A * | 7/1999 | Stanley et al. | 40/594 |
| 5,931,878 A * | 8/1999 | Chapin, Jr. | 701/29.3 |
| 5,953,405 A * | 9/1999 | Miloslavsky | 379/265.01 |
| 5,956,505 A * | 9/1999 | Manduley | 713/1 |
| 5,968,110 A * | 10/1999 | Westrope et al. | 705/26.81 |
| 5,991,393 A * | 11/1999 | Kamen | 379/266.07 |
| 5,991,395 A * | 11/1999 | Miloslavsky | 379/265.02 |
| 5,995,614 A * | 11/1999 | Miloslavsky | 379/265.11 |
| 5,995,615 A * | 11/1999 | Miloslavsky | 379/265.11 |

(Continued)

FOREIGN PATENT DOCUMENTS

WO WO2009/130605 * 10/2009 ............. G06F 3/048

*Primary Examiner* — Bennett Sigmond
(74) *Attorney, Agent, or Firm* — Gibb & Riley, LLC

(57) ABSTRACT

A method and system receives a first data feed from at least one third-party computerized device by way of a computerized network connected to the customer computerized device. This first data feed is displayed through the display item. The graphic user interface receives customer interaction information when the customer interacts with the display item. The method transmits such customer interaction information to the third-party computerized device by way of the customer computerized network. The customer computerized device then receives a second data feed from the third-party computerized device by way of the computerized network. The second data feed is different than the first data feed and the second data feed is based on the customer interaction information and/or the group usage statistics.

15 Claims, 4 Drawing Sheets

(56) References Cited

U.S. PATENT DOCUMENTS

| | | | | |
|---|---|---|---|---|
| 5,999,915 | A * | 12/1999 | Nahan et al. | 705/26.8 |
| 6,032,004 | A | 2/2000 | Mirabella, Jr. et al. | |
| 6,055,308 | A * | 4/2000 | Miloslavsky et al. | 379/265.03 |
| 6,055,509 | A * | 4/2000 | Powell | 705/14.1 |
| 6,055,514 | A * | 4/2000 | Wren | 705/36 R |
| 6,236,955 | B1 * | 5/2001 | Summers | 703/6 |
| 6,236,977 | B1 * | 5/2001 | Verba et al. | 705/7.32 |
| 6,266,651 | B1 * | 7/2001 | Woolston | 705/26.3 |
| 6,343,273 | B1 * | 1/2002 | Nahan et al. | 705/5 |
| 6,381,324 | B1 * | 4/2002 | Shaffer et al. | 379/211.02 |
| 6,389,028 | B1 * | 5/2002 | Bondarenko et al. | 370/401 |
| 6,389,133 | B1 * | 5/2002 | Kamen | 379/266.07 |
| 6,408,263 | B1 * | 6/2002 | Summers | 703/6 |
| 6,600,822 | B2 * | 7/2003 | Kamen | 379/266.07 |
| 6,625,139 | B2 * | 9/2003 | Miloslavsky et al. | 370/352 |
| 6,728,679 | B1 * | 4/2004 | Strubbe et al. | 704/270.1 |
| 6,748,365 | B1 * | 6/2004 | Quinlan et al. | 705/14.26 |
| 6,957,189 | B2 * | 10/2005 | Poage et al. | 705/7.29 |
| 7,043,716 | B2 * | 5/2006 | Zimmer et al. | 717/107 |
| 7,236,950 | B2 * | 6/2007 | Savage et al. | 705/34 |
| 7,240,020 | B2 * | 7/2007 | Poage et al. | 705/7.29 |
| 7,379,900 | B1 * | 5/2008 | Wren | 705/26.3 |
| 7,516,137 | B1 * | 4/2009 | Earle et al. | 705/348 |
| 7,840,901 | B2 * | 11/2010 | Lacey et al. | 715/738 |
| 8,275,663 | B2 * | 9/2012 | Rochford et al. | 705/14.67 |
| 8,635,255 | B2 * | 1/2014 | Roberts et al. | 707/805 |
| 8,694,379 | B2 * | 4/2014 | Wiseman et al. | 705/14.72 |
| 2001/0042016 | A1 * | 11/2001 | Muyres et al. | 705/14 |
| 2003/0187767 | A1 * | 10/2003 | Crites et al. | 705/35 |
| 2003/0221162 | A1 * | 11/2003 | Sridhar | 715/501.1 |
| 2004/0059634 | A1 * | 3/2004 | Tami et al. | 705/17 |
| 2005/0144073 | A1 * | 6/2005 | Morrisroe et al. | 705/14 |
| 2006/0005207 | A1 * | 1/2006 | Louch et al. | 719/328 |
| 2006/0265429 | A1 * | 11/2006 | Pendergast et al. | 707/201 |
| 2006/0293949 | A1 * | 12/2006 | Grossnickle et al. | 705/14 |
| 2007/0073585 | A1 * | 3/2007 | Apple et al. | 705/14 |
| 2007/0118813 | A1 * | 5/2007 | Forstall et al. | 715/805 |
| 2007/0156505 | A1 * | 7/2007 | Agassi et al. | 705/10 |
| 2008/0011844 | A1 * | 1/2008 | Tami et al. | 235/385 |
| 2008/0201220 | A1 * | 8/2008 | Broder et al. | 705/14 |
| 2009/0006371 | A1 | 1/2009 | Denoue et al. | |
| 2009/0007054 | A1 * | 1/2009 | Voss | 717/101 |
| 2009/0043907 | A1 * | 2/2009 | Peterson et al. | 709/231 |
| 2009/0070409 | A1 | 3/2009 | Clayton et al. | |
| 2009/0164312 | A1 * | 6/2009 | Nadig | 705/14 |
| 2009/0192998 | A1 * | 7/2009 | Paulsen | 707/3 |
| 2009/0198546 | A1 * | 8/2009 | Earle et al. | 705/7 |
| 2009/0210270 | A1 * | 8/2009 | Quan et al. | 705/7 |
| 2009/0216693 | A1 | 8/2009 | Rujan et al. | |
| 2009/0287573 | A1 * | 11/2009 | Miller et al. | 705/14.55 |
| 2009/0288014 | A1 * | 11/2009 | Fujioka | 715/745 |
| 2010/0049603 | A1 * | 2/2010 | Peterson et al. | 705/14.45 |
| 2010/0114739 | A1 * | 5/2010 | Johnston | 705/27 |
| 2010/0235806 | A1 * | 9/2010 | Mohan | 717/100 |

* cited by examiner

TWO-WAY MARKETING PERSONALIZED DESKTOP APPLICATION

BACKGROUND AND SUMMARY

Embodiments herein generally relate to the use of constantly present computer applications, such as widgets and gadgets, and more particularly to a constantly present application running on a computing device such as a personal computer or a cell phone that provides two-way communication and is customized for each particular user based on user feedback and user interaction with the application.

Enterprise Marketing has emerged as a major service and provides services to help companies (normally very large companies) run marketing campaigns. Enterprise Marketing applications such as Direct Marketing, Marketing Collaterals, and Promotional Transaction generally have the same main goals. The first is to let customers and potential customers (known as prospects) know what services a company (called the purveyor) has available to use or what products the purveyor has available to purchase (and what value these products or services bring). A second goal is to gather information about the prospects to improve the next marketing campaign and to improve the purveyor's products or services. Another goal is to advertise a purveyor's brand. In other words, these different marketing applications are different methods of communicating with a prospect.

The success of a marketing campaign is often measured in return on investment, conversion rates (how many prospects actually purchased or licensed the advertised product or service), and how much information was gathered. However, the high cost of marketing campaigns reduces the purveyor's return on investment. Very often purveyors know very little about their customers even after a campaign and must still guess what a customer wants. This keeps the return low, further reducing the return on investment. Furthermore, sometimes purveyors cannot make a connection between a campaign and a sale, so they cannot evaluate the success of a campaign and therefore cannot evaluate the return on investment.

The embodiments herein provide new methods and systems of delivering marketing information to prospects and gathering information about what those prospects want and the success of a campaign. In other words the embodiments herein: decrease costs and more accurately show connections between a campaign and sales; are used to increase the amount and accuracy of the data gathered; and encourage permanent conversations between the purveyor and the prospect by allowing the prospect to choose and describe what they want to see.

The embodiments herein describe a marketing application based on Widgets. Widgets are configurable software programs that display data feeds. Familiar Widgets display current weather in a zip code or current stock market prices, or current news stories. But many other kinds of widgets are available. (Widgets are sometimes also known as Gadgets). Some widgets in the embodiments herein display a marketing information data feed. It is highly configurable so that it can act as a platform for creating marketing messages and initiating and maintaining marketing conversations with customers for any industry.

From the prospect's point of view, one advantage of the embodiments herein is that the prospect no longer receives advertisements or marketing materials that they do not want. The advertisements are delivered to prospects by one of several electronic methods and are displayed in a variety of ways (optionally chosen by the prospect). The prospect can place the Widget they have received on their desktop, cell phone, or internet home page (such as Facebook or iGoogle, available respectively from Facebook, Inc. Palo Alto, Calif., USA and Google Corp., Mountain View Calif., USA). The embodiments herein deliver marketing messages through a data feed and provide a method for the prospect to adjust the marketing message they receive. Thus, the embodiments herein tell the purveyor what the prospect is really interested in. Further, the embodiments herein gather data and gain insights directly from prospects rather than from inferences derived from data analysis. Also, the embodiments herein provide incentives for the prospect to continue the conversation with the purveyor.

Rich desktop applications (RDAs) are widget and gadget type applications that can be provided by marketers (purveyors) and downloaded by users, who then run the RDAs on their desktops. One benefit of RDAs to both the end user and the marketer is that they support active, two-way communication but do not require a constant Internet connection to run the application. The Internet connection is only used for updating content or linking back to the marketer.

For the development of RDAs a number of platforms are available including Adobe AIR (available from Adobe Corp., San Jose Calif., USA) Google Gears (available from Google Corp., Mountain View Calif., USA). Microsoft Corp. (Redmond, Wash., USA) has also entered the market with Windows Presentation Foundation (WPF) and a Java platform is also available from Sun Microsystems (Santa Clara, Calif. USA).

One exemplary method embodiment herein displays a rich desktop application (such as a two-way widget or gadget, which is sometimes referred to herein as a "display item") on a graphic user interface of a customer computerized device. The customer computerized device receives a first data feed from at least one third-party computerized device by way of a computerized network connected to the customer computerized device. This first data feed is displayed through the display item.

The graphic user interface receives customer interaction information when the customer interacts with the display item. The method transmits such customer interaction information to the third-party computerized device by way of the customer computerized network. The method can additionally monitor the usage of a plurality of display items on many different computerized devices operated by many different users to gather group usage statistics relating to the display items.

Based on the embodiments herein, the customer computerized device then receives a second data feed from the third-party computerized device by way of the computerized network. The second data feed is different than the first data feed and the second data feed is customized for the customer based on the customer interaction information and/or the group usage statistics. Therefore, the embodiments herein provide each user a customized data feed for their desktop widget or gadget that is based on the user's usage of the widget or gadget (or other similar individuals' usage of the widget or gadget).

While the foregoing embodiments can be utilized to provide any form of information to a user, one particular embodiment herein provides marketing information from a purveyor to a potential customer that is customized according to the input received from the customer. More specifically, these embodiments begin by installing a platform independent application within memory of the customer computerized device. The platform independent application executes instructions through a processor of the customer computerized device to cause the graphic user interface to display the marketing display item. The platform independent application can be distributed, by the customer and/or the purveyor, to a plurality of customer computerized devices operated by a plurality of customers through web pages, e-mail, instant messaging, text messaging, social networks, etc.

These embodiments display an instance of a marketing display item (widget or gadget) on a graphic user interface of the customer's computerized device. In these embodiments, the marketing display item comprises marketing information, links to resources, links to other applications, etc. The instance of the marketing display item is based on one of a plurality of pre-established, configurable templates. The embodiments herein establish many parent marketing display items using one or more of the templates. One parent marketing display item is created for each different marketing campaign.

The customer computerized device again receives a first data feed from at least one purveyor computerized device by way of a computerized network connected to the customer computerized device. The first data feed is again displayed through the marketing display item.

Similarly, the graphic user interface receives customer interaction information when the customer interacts with the marketing display item. These embodiments transmit the customer interaction information to the purveyor computerized device by way of the customer computerized network.

Then, the customer computerized device receives a second data feed from the purveyor computerized device (by way of the computerized network). The second data feed is again different than the first data feed, and the second data feed is based on the customer interaction information.

Thus, again the embodiments herein provide each user a customized data feed for their desktop widget or gadget that is based on the user's usage of the widget or gadget (or other similar individuals' usage of the widget or gadget). Further, the embodiments herein monitor the development of the parent marketing display item to calculate return on investment values for each of the marketing campaigns.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Large companies use extraordinarily complex and expensive work processes for their enterprise marketing applications. Mid-size companies often find that the software and services required to run major marketing campaigns are too expensive. Most small companies have no or almost no marketing budget at all and therefore have limited ability to communicate with their customers in an efficient way.

One exemplary method embodiment herein displays a rich desktop application (such as a two-way widget or gadget, which is sometimes referred to herein as a "display item") on a graphic user interface of a customer computerized device. The customer computerized device receives a first data feed from at least one third-party computerized device by way of a computerized network connected to the customer computerized device. This first data feed is displayed through the display item.

The graphic user interface receives customer interaction information when the customer interacts with the display item. The method transmits such customer interaction information to the third-party computerized device by way of the customer computerized network. The method can additionally monitor the usage of a plurality of display items on many different computerized devices operated by many different users to gather group usage statistics relating to the display items.

Based on the embodiments herein, the customer computerized device then receives a second data feed from the third-party computerized device by way of the computerized network. The second data feed is different than the first data feed and the second data feed is customized for the customer based on the customer interaction information and/or the group usage statistics. Therefore, the embodiments herein provide each user a customized data feed for their desktop widget or gadget that is based on the user's usage of the widget or gadget (or other similar individuals' usage of the widget or gadget).

Figure 1:
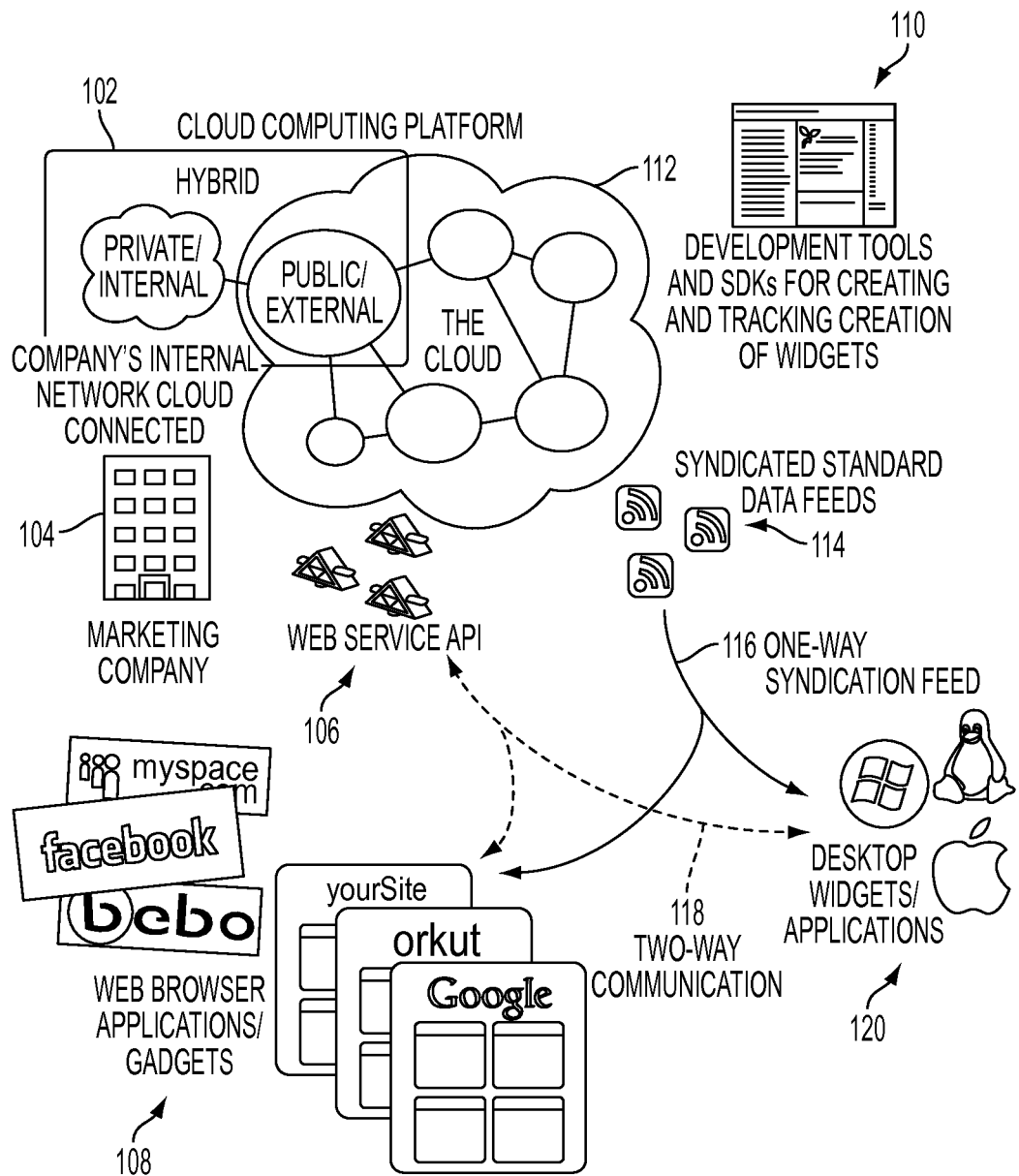
FIG. 1 is a schematic diagram illustrating various data flows between different elements according to embodiments herein.

FIG. 1 is a schematic diagram illustrating the various devices, elements and data flows performed by embodiments herein. More specifically, item 120 represents the various desktop widgets, and other applications that may appear on the customer's computerized device. Item 108 represents the various web browsers, applications, gadgets, etc. that are also utilized by the customer computerized device. Various syndicated standard data feeds are shown as item 114 and are supplied to the widgets and gadgets according to a one-way syndication feed 116.

However, rather than using a standard one-way syndication feed 116, the embodiments herein employee web service APIs 106 that utilize a two way communication 118. More specifically, the marketing company 104 creates the web service APIs 106 utilizing various development tools and software development kits 110 for the creation (and tracking the creation of) various widgets and gadgets.

The marketing company 104 can connect with the customer's computerized device using any form of communication such as text messages, instant messaging, Internet, local network, telephone conductivity, as shown by item 102. More specifically, item 102 can represent a cloud computing platform and may include a hybrid cloud computing platform that is made up partially of the company's internal network cloud and a public external cloud 112. The cloud 112 is utilized for distribution, computation, data storage, and hosting.

Figure 2:
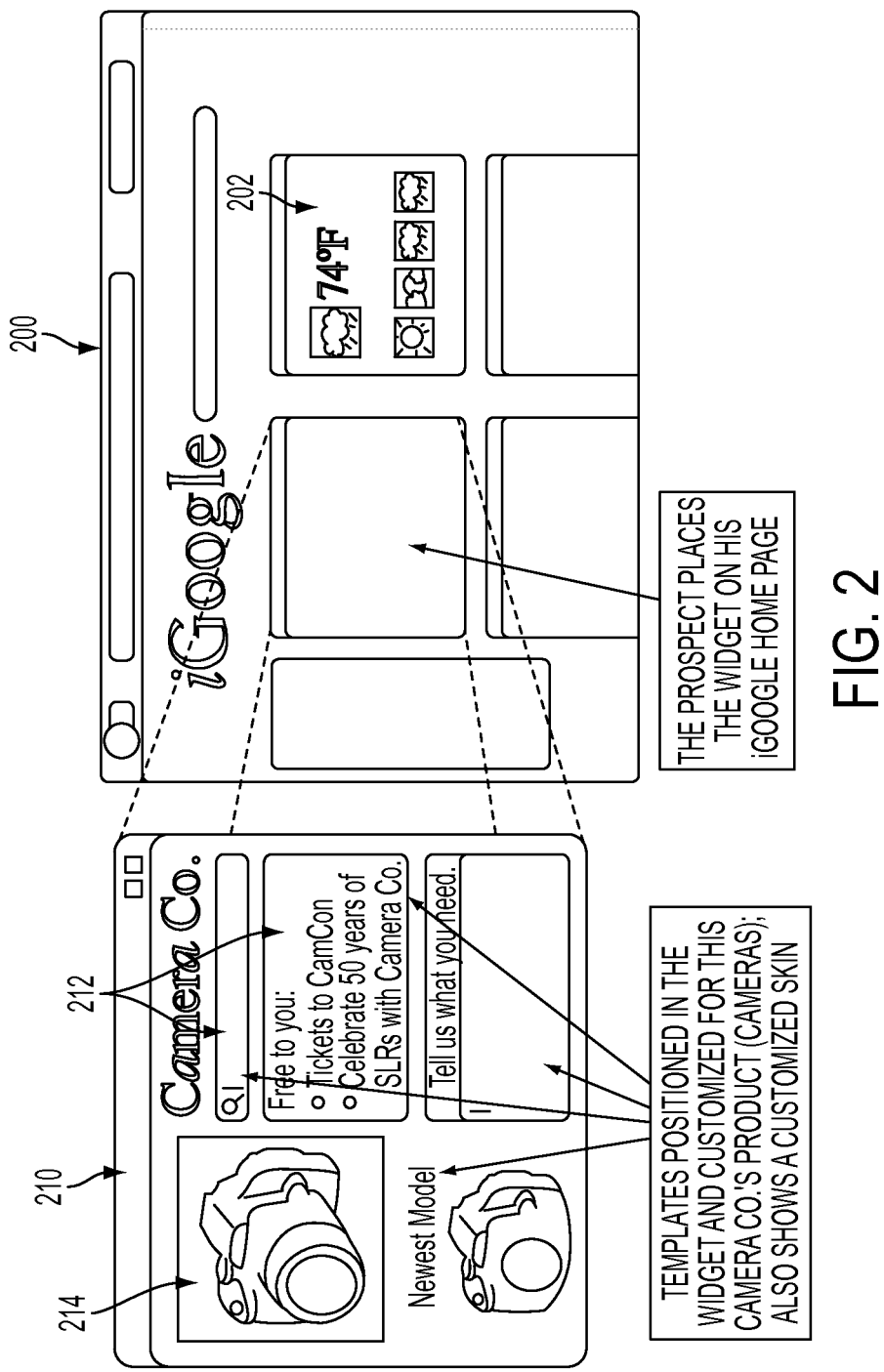
FIG. 2 is a schematic diagram of graphic user interface according to embodiments herein.

FIG. 2 illustrates the manner in which one widget according to embodiments herein would appear within a customer's computer graphic user interface. More specifically, the graphic user interface shown in FIG. 2 is illustrating a web page 200 (an iGoogle web page). The webpage 200 includes a number of widgets, one of which (item 202) is a weather widget that constantly receives weather data and displays such weather data. Widget 210 is a widget that operates using a two way communication, according to embodiments herein.

In FIG. 2, Widget 210 is shown in an expanded view to allow the features to be observed clearly. Widget 210 includes various templates 212, 214. For example, templates 212 can allow real-time communication between the purveyor and the prospect, while templates 214 can allow graphic illustrations and/or advertisements to be displayed.

Each of the widgets mentioned herein is configurable. Thus, each widget development tool contains a set of "templates" 212, 214. FIG. 2 is merely one example and many other templates are included within embodiments herein. The templates allow the purveyor to create a different widget for each marketing campaign, as necessary.

For example, one template is the "My Experience" template. This template allows the prospect to describe what they do or have done with this product or in this market. For example, the prospect may see a "what I do" or "what I have" section of the widget; the prospect will be able to describe "what I do" related to this particular market (e.g., "what's in my golf bag" or "my personal Everest").

Another is a "Community" template that allows a prospect who receives the widget containing the customized community template to access and join social networking communities related to the product or market. These communities (e.g. discussion groups) may be set up by a prospect, and/or by the purveyor; or may be pre-existing communities (such as Facebook) that can be accessed from the widget. An additional template is a "Market Data Feed" template that allows the purveyor to send each prospect who has the widget information about the products and services. The purveyor can update the data feed for new products and services, or based on user feedback; different data can go to different prospects.

Another is a "Feedback" template that provides a variety of methods by which a prospect can communicate back to the purveyor (i.e. about what the prospect prefers. For example the prospect might see a "What I Want" section of the widget). A further template is a "Sell Stuff" template that allows the purveyor to sell their own products and services and also allows the purveyor to set up a mechanism in the widget that allows the prospect to sell things (e.g. photos taken with the purveyor's cameras). An additional template is a "Customer Identification" template that allows (or requires) the prospect to enter information about him- or her-self. A "Customer Survey" template allows the purveyor to ask a set of structured questions to the prospects. These may be personalized for individual prospects.

An additional template is an "Incentives" template. One example of an incentives template is a purveyor to prospect template of tickets, friends, money, coupons, credits, credit, events, create your own campaign, share the revenue, etc. Another example of an incentives template is a prospect to purveyor template based on the concept that "I can get xxx sales for you if you yyy".

A "Search" template allows the prospect to find things of interest to him that can be displayed in or provided by the widget. The purveyor can customize the search template to limit the search capabilities, e.g. the prospect can only search for products and coupons. A "Custom" template allows the purveyor to create a unique or specialized template with functionality not included in the default templates. The embodiments herein allow the inclusion of additional templates later, as necessary.

The purveyor (or service provider hired by the purveyor) creates the widget by adding the desired templates and customizing them for a given product or service. The purveyor can also configure the widget's overall user interface (the widget's "skin") so that it has the look and feel they want. Basic skins can be saved and reused.

In addition, the Widget according to embodiments herein is monitorable. The purveyor (or a service provider hired by the purveyor) can monitor all of the activities that the prospect engages in when they uses the widget. Monitorable functionality also includes the ability to define what makes a campaign (a distribution of a set of widgets to a prospect list) successful and to monitor the results against that set of criteria. For example, a campaign might define success according to parameters as: 20% of the prospects purchase a product; the campaign generates $20M in revenue; 10% of the prospects engage the purveyor in a conversation using the feedback or customer survey templates; widgets containing a particular phrase generate $110K in purchases from existing customers; personalized widgets generate twice as many responses as widgets containing the same message; etc.

Also, the embodiments herein monitor the following information which can enable a better understanding of the ROI on a marketing campaign (among other analyses). The embodiments herein track who worked on a particular widget for a particular marketing campaign; when and for how many hours each person worked on the widget; how long the widget for a particular campaign was under development (duration of the design effort) before it was deployed (distributed). This monitoring and data aggregation is made possible by making the web services available for the collection of this data, and building into the platform analytical tools and reporting systems.

The information aggregated on prospects is accessible via customizable portals and/or web services. Security measures are in place to restrict access to the marketing company and their client. The security is configurable to allow others to access the data for free or a per charge basis. This marketing information collected and analyzed correctly makes for a very lucrative asset to the marketing company. The data also helps target viable clients more accurately.

The widgets in embodiments herein are easily distributable. The purveyor can distribute the widget by email, voice (or voice mail), text message, instant message, or social networks. The prospects who receive the purveyor's widget are those on the current campaign's prospect list. Similarly, once the prospect has received the widget, they can distribute it to their friends and acquaintances by the same methods. (The purveyor can discover who the prospect sent the widget to and add him/her to the prospect list.)

With respect to the technology, widgets/gadgets are standalone components, and are very small in nature. With no installation required or fully automated installation enabled, these components can be distributed to end users via multiple mechanisms such as Web page, E-Mail, Instant Messaging, other applications, text messages (for mobile platforms), and social networks. The component is smart enough to know whether it is running for the first time on a particular platform. The first time the component is accessed it will ask for configuration information that will be stored locally on the user's platform of choice and will not need to ask for the information again. If one were to copy the component to another platform it will automatically query the end user for the configuration data, making this component very easy to distribute over many different mediums.

After receiving the widget, the prospect can place it on their local desktop (Windows or Mac); internet desktop (iGoogle; Yahoo Home Page; Facebook home page; MySpace home page; etc.); cell phone (iPhone; iPod; Android phone; Blackberry). Using write once, run anywhere technology, once a component is created the component can run on any platform and be distributed unmodified.

One exemplary scenario is that if a user has the widget running on their desktop, they can copy it to their cell phone and use it. While at a friend's house, the friend may see the widget and want it. The user merely sends it from their phone to the friend's phone. Later the friend may put the widget on their laptop by emailing the widget from their phone to their laptop, where the widget runs unmodified. The widget/gadget framework that is used to build these components automatically detects whether or not it is running on a display limited platform such as a mobile device, and reduces its visual footprint if necessary.

The widgets herein provide real time, remote updatability and communications. A purveyor can push updates to widgets "in the field" for a number of purposes. For example, for a widget placed in a user's cell phone, the data feed may change based on the user's location. Also, the entire design of a widget can be updated remotely and automatically. For example, as a marketing experiment, a purveyor can create two different widgets and send one to one group of people and another to a different group in the same market segment. The widget which produces the lower ROI after a month gets updated to look like the widget that produces the higher ROI. This happens without sending a new widget to those who received the under-performing widget.

In addition, the widget is accessible by other applications. For example, Web page advertisers will be able to integrate their advertisements with widgets using the widget's API's. In this example scenario, the advertisements that appear on web pages accessed by the user will communicate with the widget on the prospect's desktop to determine the prospect's preferences; the web page ads will then adjust to more closely match those preferences.

With respect to the data feed provided, most of the templates are driven by data feeds. When using the templates to design the widget, the purveyor will connect the templates to data sources. The data sent to a particular template is based on the logic of the data source's systems. For example, two prospects who are interested in golf may see different products in the market data template (perhaps based on their feedback or on information in the prospect list); one may see golf clubs and the other may see golf cleats.

Data feeds are standardized Atom feeds, but are tailored based on user configuration data, and survey responses. Atom is an XML-based document format that describes lists of related information known as "feeds". The embodiments herein take the data customization to the next level by tracking product purchases and searches. Further, by acquiring this type of data, special offers can be made possible to individual users, with higher likeliness of that end user accepting that offer. Also, with embodiments herein, generic data templates exist and are customizable by the gadget/widget developer, so campaigns and marketing efforts can be customized and help ensure successful results.

The widgets according to embodiments herein are personalized for each individual user. As the purveyor learns more about the prospect (either through inference based on an analysis of the prospect's behavior, from direct feedback from the prospect in the customer survey template or the feedback template, or from studying the discussions in the communities the prospect participates in) the purveyor can adjust the marketing message that the particular prospect receives.

Aggregation of the marketing data, such as end user surveys/feedbacks, purchase information, and prior data collected on similar campaigns allow the purveyor to perform analytics on these data sets. With the power of the cloud computing, the platform of this data set is much larger than ever before possible due to the compute and storage capacity in the cloud. Analytic results are used by the purveyor to customize data feeds to particular end users/customers.

The embodiments herein are also secure and private. The widget mechanism and underlying infrastructure ensures that the prospect's information cannot be accessed by any unauthorized person or system. Furthermore, the system enables a prospect to block receipt of a widget, either through a particular channel and/or from a particular vendor, or altogether. Finally, the prospect can decide who is and who is not allowed to see they personal information such as responses to a survey.

This security is provided by secured pipes using a secure hypertext transfer protocol (HTTPS) to transfer data to the web services. Data feeds (unless specifically containing end user information) not need be secured. The secure communication is accomplished through certificates and a signed widget/gadget component. By signing the component itself, the embodiments herein can ensure that the component has not been tampered with and that it is authentic. Using certificates that are embedded in the component to make the secured connection to the web services for communication will ensure that any data transferred over the wire is secure and safe from prying eyes.

The embodiments herein easily accommodate a standard internet cloud computing infrastructure. This allows the embodiments herein to provide a single system to all of its customers (the purveyors) with all of the economies of scale, maintainability, and information benefits that cloud computing brings. The system is multi-tenant so that there is only one underlying instance of the direct marketing widget application, but each user sees only their own version. This includes the collection of data that enables one to determine exactly how to continuously improve the system.

The embodiments herein are designed to run on any infrastructure utilizing currently available operating systems and can be easily moved to different operating systems. The cloud platform allows for a minimized cost of startup and will allow for rapid expansion and large compute spikes. The cloud computing platform illustration depicts the role of the cloud, which is storing data, providing compute, hosting the web portals and services. The cloud also allows integration into the marketing company's private network while providing all the necessary security.

Further, the embodiments herein are API-based. All of the widget functionality (including the template functionality) is available via an API so that developers can integrate widgets into other applications and environments and so that the widget functionality can be extended as necessary.

With respect to the development environment, a widget development environment is available to make it easy to lay out the desired widget for a campaign (e.g., by dragging and dropping templates into a blank widget or altering an existing widget). The templates can then be customized and attached to the appropriate data feeds by standardized dialog boxes (which also include scripting mechanisms using standard scripting languages such as Java Script (available from Sun Microsystems, Santa Clara, Calif. USA) to allow customized behaviors for the template).

As mentioned above, the exemplary embodiments herein display a rich desktop application (such as a two-way widget or gadget, which is sometimes referred to herein as a "display item") on a graphic user interface of a customer computerized device. In some more specific embodiments, marketing information can be provided from a purveyor to a potential customer that is customized according to the input received from the customer.

Figure 3:
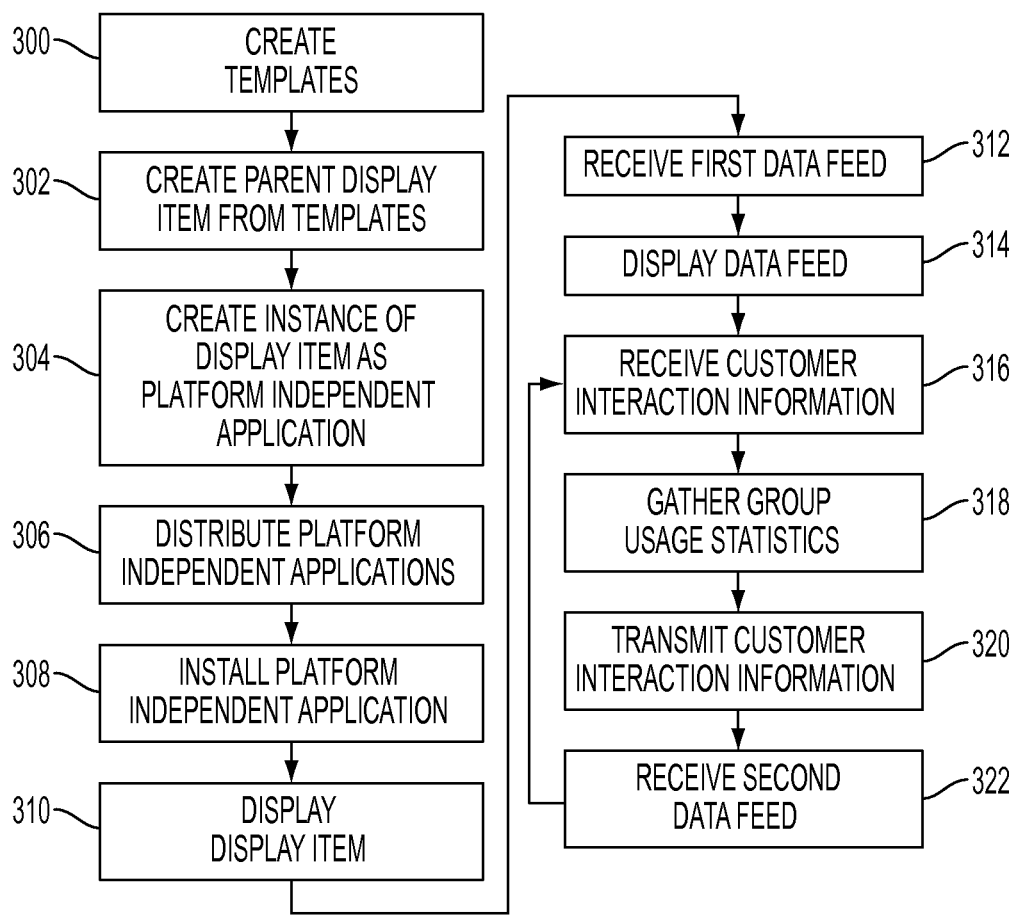
FIG. 3 is a flow diagram illustrating various method embodiments herein.

The embodiments display an instance of a marketing display item (widget or gadget) on a graphic user interface of the customer's computerized device. The instance of the marketing display item is based on one of a plurality of pre-established, configurable templates which are created in flowchart item 300, in FIG. 3. The embodiments herein establish many "parent" marketing display items using one or more of the templates in item 302. For example, one parent marketing display item can be created for each different marketing campaign. Specific instances of the display item will be created from each parent marketing display item.

In item 304, the embodiments herein create one instance of a display item from one of the parent marketing display items. The instance of the display item is the actual widget or gadget that will appear on the graphic user interface of the customer's computerized device. The instance of the display item is maintained as a platform independent application that can be distributed over networks.

The platform independent applications can be distributed, by the customer and/or the purveyor, to a plurality of customer computerized devices operated by a plurality of customers through web pages, e-mail, instant messaging, text messaging, social networks, etc., as indicated by item 306.

The embodiments herein install one of the platform independent applications within memory of the customer computerized device in item 308. The platform independent application executes instructions through a processor of the customer computerized device to cause the graphic user interface to display the display item in item 310. In some embodiments, the marketing display item comprises marketing information, links to resources, links to other applications, etc.

The customer computerized device receives a first data feed from at least one purveyor computerized device by way of a computerized network connected to the customer computerized device in item 312. The first data feed is displayed through the marketing display item in item 314.

The graphic user interface receives customer interaction information when the customer interacts with the marketing display item in item 316. The method can additionally monitor the usage of a plurality of display items on many different computerized devices operated by many different users to gather group usage statistics relating to the display items, as shown in item 318. The embodiments transmit the customer interaction information to the purveyor computerized device by way of the customer computerized network in item 320.

Then, the customer computerized device receives a second data feed from the purveyor computerized device (by way of the computerized network) in item 322. The second data feed is again different than the first data feed, and the second data feed is customized for the customer based on the customer interaction information and/or the group usage statistics.

Thus, again the embodiments herein provide each user a customized data feed for their desktop widget or gadget that is based on the user's usage of the widget or gadget (or other similar individuals' usage of the widget or gadget). Further, the embodiments herein monitor the development of the parent marketing display item to calculate return on investment values for each of the marketing campaigns.

Figure 4:
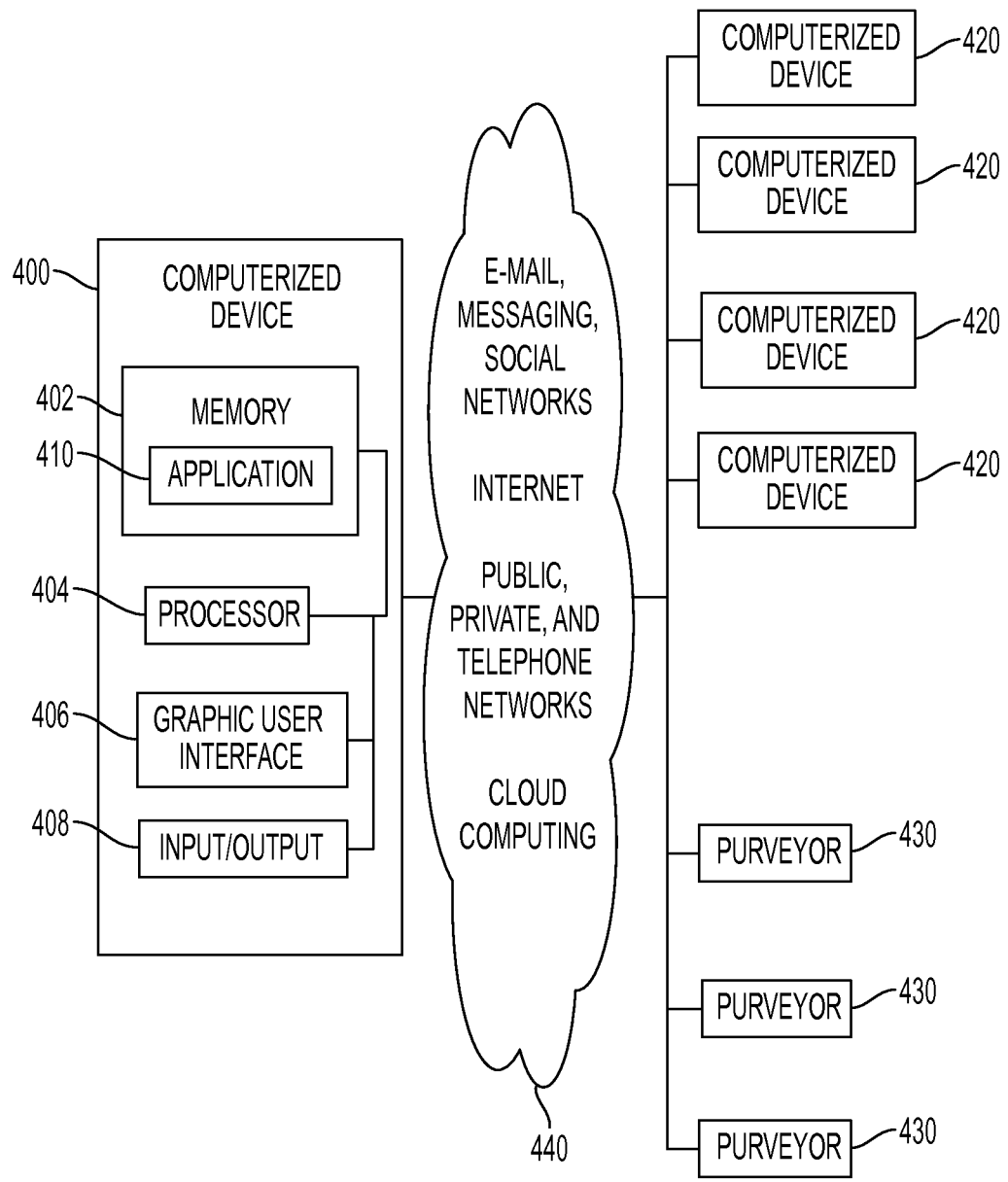
FIG. 4 is a schematic diagram illustrating the various computerized devices and networks utilized by embodiments herein.

These processes are also illustrated in the diagram shown in FIG. 4. In FIG. 4, the embodiments herein install a platform independent application 410 within the memory 402 of the customer computerized device 400. The platform independent application 410 executes instructions through a processor 404 of the customer computerized device 400 to cause the graphic user interface 406 to display the marketing display item and perform the other actions mentioned herein.

The platform independent application 410 can be distributed using, for example, an input/output 408 of the customer's computerized device 400 and/or one of many purveyors 430, to a plurality of other customer computerized devices 420. Each of the purveyors 430 and other computerized devices 420 may have similar components to that shown in the computerized device 400; however, such components are not illustrated to allow the drawing to avoid clutter within the drawings.

The other customer's computerized devices 420 can be operated by a plurality of customers through web pages, e-mail, instant messaging, text messaging, social networks, etc., all of which are illustrated as item 440. The purveyors 430 are generally marketing entities such as individuals or corporations that provide information and marketing material to the various customer computerized devices 400, 420.

These embodiments display an instance of a marketing display item (widget or gadget) on the graphic user interface 406 of the customer's computerized device 400. In these embodiments, the marketing display item comprises marketing information, links to resources, links to other applications, etc.

The customer computerized device 400 again receives a first data feed from at least one purveyor computerized device 430 by way of a computerized network connected to the customer computerized device 400. The first data feed is again displayed through the marketing display item.

Similarly, the graphic user interface 406 receives customer interaction information when the customer interacts with the marketing display item. These embodiments transmit the customer interaction information to the purveyor computerized device 430 by way of the customer computerized network.

Then, the customer computerized device 400 receives a second data feed from the purveyor computerized device 430 (by way of the computerized network). The second data feed is again different than the first data feed, and the second data feed is customized for the customer based on the customer interaction information.

The embodiments herein can provide information technology as a service over a network (Internet), which allows the embodiments herein to be a logical fit with cloud computing. The embodiments herein can also provide web services that handle collections of data such as surveys, identification, feedback, and configurations of the data sent back from the client widget (gadget). Widget creation is in a platform independent language, such as Java (available from Sun Microsystems, Santa Clara Calif., USA) or Silverlight (available from Microsoft Corp., Redmond Wash., USA). Both of these programs contain the features to build attractive and feature rich gadgets/Widgets that will be platform independent and can constantly (persistently) exist on the desktop.

Widgets can also be developed with deployment to the web browser in mind such as iGoogle gadgets (available from Google Corp., Mountain View Calif., USA), and Flash components (available from Adobe Corp., San Jose Calif., USA) which are platform independent also. Keeping the data feeds and communication standardized, integration into social networking applications such as Facebook (available from Facebook, Inc. Palo Alto, Calif., USA) Twitter (available from Twitter, Inc. San Francisco, Calif. USA), and MySpace (available from News Corporation, Beverly Hills, Calif., USA) is made possible. The development of Widgets is simplified by the provided software development kits (SDKs) and Integrated Development Environment (IDE). The IDE also tracks development time for each Widget, to help the marketing company track costs for each individual project.

Also, all of the Widget functionality (including the template functionality described below) can be accessed by application programming interfaces (API's) so that developers can integrate Widgets into other applications and environments and so that the Widget functionality can be extended.

The following usage examples illustrate the operation of the embodiments herein. In one example, a purveyor of photographic equipment, Camera Co., has acquired a list of prospects. These are people who have purchased photographic equipment and accessories from Camera Co. in the past three years and who are known to have travelled. The campaign's initial focus is on sharing pictures and experiences. The goal is to build a sense of community among owners of the Camera Co.'s equipment.

The Camera Co. customizes the widget using the built-in templates. In particular, the "My Experience" template is designed as an "On Location with" partition which allows the prospect to describe in text where they have been and show what pictures they have taken in those locations. Camera Co. allows the prospects to limit access to the pictures if desired.

Other purveyors such as golf equipment manufacturers would design the "MyExperience" field so the user can describe "what's in my golf bag" and to allow others (e.g. friends) to see his "virtual golf bag." A manufacturer of climbing equipment would allow the user to describe "my personal Everest" and "my gear."

The "Community" template is designed as a "Discussions" section, which is a bulletin board that enables discussion threads among the prospects, including discussions about the "On location" images and descriptions, as well as the Camera Co.'s cameras and photographic accessories. The "Marketing Data Feed" template displays Camera Co.'s wares and marketing messages which are personalized (based on feedback the user enters in the widget's "Tell us how to improve" section).

The "Feedback" template is designed as a section called "Tell us how to improve." It can contain two sections. The first allows the prospect to tell Camera Co. how to improve the products. The second allows the prospect to describe what products and services they'd prefer to see information about. Camera Co. uses the "Sell Stuff" template to design a "Cameras and Equipment" store where the prospects can purchase Camera Co. products and services. The purveyor also uses the Sell Stuff template a second time to create a section of the widget where the prospect can sell his old camera equipment.

Camera Co. uses the "Incentives" template to design two "Things for You" sections. The first allows Camera Co. to send personalized digital coupons that allow the prospect to buy cameras at a discount. With the second section, Camera Co. sends free tickets to events specially chosen (personalized) for each prospect (e.g. a ticket to an art museum). Camera Co. uses the "Search" template to allow the user to find camera with particular specifications and to find coupons for cameras. FIG. 2, discussed above, shows an abbreviated example of how the designers apply the templates in this example.

Once the widget is designed, Camera Co. then sends the widget by email to prospects who are on the prospect list. Each widget is personalized to show the items the individual recipient has purchased recently. Prospects who are interested place the widget on their desktops, web home page, or cell phone. Once the prospect places the widget, it goes live and the conversation between the prospect and Camera Co. can begin. The widget invites the each prospect to interact with its various sections.

The prospect's friend may also love photography, so the prospect may forward the widget to him by text message. Camera Co. analyzes the discussion threads, feedback, the use of coupons, etc., to improve its products and services, and to increase the accuracy of its marketing messages. Camera Co. also analyzes the time it took to develop the widget and the campaign to understand how it can reduce its time to market for the next campaign.

The embodiments herein simplify the task of marketing products and services to the largest possible number of people, achieve new levels of information and insight about what prospects really want, and bring personalization to new levels of accuracy. That is, prospects will be more likely to listen to a purveyor's marketing message and act on it because they have told the purveyor directly what it is they want to see. The purveyor can provide that information quickly and directly.

Prospects can look for and find the same kind of information today. It's very easy using search engines. Furthermore, people regularly comment on products, blogs, marketing messages, purveyors, etc. These comments are normally used by purveyors to adjust their messages, products, and services. This is a pull model where people go and get the information.

Also, people can happen upon an advertisement or marketing messages while browsing web sites or running searches. This is a hybrid model where the purveyor pushes marketing messages into the world and hopes that someone will find them interesting. If a person does find it interesting they accesses or pulls more information.

On the other hand, the current embodiments herein describes a push model where particular prospects are targeted and are provided information directly, at first based on their previous behavior and, over time, based more on their stated preferences.

Further, the embodiments herein provide access to and use of unprecedented amounts of data about the enterprise marketing market; payment for use of the widget platform; and an insider's view of the best ways to use the widget platform. To the purveyor more accurate information about the prospects is provided, as is a faster time to market with marketing data, as well as simpler value chains for marketing campaigns. For the prospect, the embodiments herein provide fewer advertisements that they do not want to see.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

Further, printing and printing devices can be utilized with the foregoing embodiments. The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A method comprising:
    displaying a display item on a graphic user interface of a customer computerized device;
    receiving, by said customer computerized device, a first data feed from at least one third-party computerized device by way of a computerized network connected to said customer computerized device, said first data feed being displayed through said display item;
    receiving, by said graphic user interface, customer interaction information when a customer interacts with said display item and said customer has a two-way communication conversation with said third-party computerized device through said display item;
    transmitting said customer interaction information to said third-party computerized device by way of said computerized network;
    monitoring usage of a plurality of display items on a plurality of different computerized devices operated by a plurality of different users to gather group usage statistics relating to said display items, said usage of said display items comprising marketing message adjustment data received from said users when said users have said two-way communication conversation with said third-party computerized device through said display item;
    receiving, by said customer computerized device, a second data feed from said third-party computerized device by way of said computerized network, said second data feed being customized for said customer based on said group usage statistics and said customer interaction information, said second data feed comprising a customized template creating a customized instance of said display item on said graphic user interface, said customized template comprising a default template altered with said group usage statistics and said customer interaction information, said customer interaction information and said group usage statistics causing each said customized template to be personalized for each said customer, and each said customized template providing that different data goes to different customers; and
    updating said display item by displaying said second data feed through said display item, said second data feed causing said display item to have an appearance of a different display item that produces a higher return on investment relative to said first data feed, based on said group usage statistics.

2. The method according to claim 1, further comprising, before displaying said display item, installing a platform independent application within memory of said customer computerized device, said platform independent application executing instructions through a processor of said customer computerized device to cause said graphic user interface to display said display item.

3. The method according to claim 2, further comprising distributing, by said customer and said third-party, said platform independent application to a plurality of customer computerized devices operated by a plurality of customers through web pages, e-mail, instant messaging, text messaging, and social networks.

4. The method according to claim 1, an instance of said display item being based on one of a plurality of pre-established, configurable templates, said method further comprising establishing one of many parent display items using one or more of said templates, one parent display item being created for each different marketing campaign.

5. The method according to claim 4, further comprising, monitoring development of said parent display items to calculate return on investment values for each said different marketing campaign.

6. A method comprising:
    displaying an instance of a marketing display item comprising one of a widget and a gadget on a graphic user interface of a customer computerized device, said marketing display item comprising marketing information, links to resources, and links to other applications;
    receiving, by said customer computerized device, a first data feed from at least one purveyor computerized device by way of a computerized network connected to said customer computerized device, said first data feed being displayed through said marketing display item;
    receiving, by said graphic user interface, customer interaction information when a customer interacts with said marketing display item, said customer interaction information comprising marketing message adjustment data received when said customer has a two-way communication conversation with said purveyor computerized device through said marketing display item;
    transmitting said customer interaction information to said purveyor computerized device by way of said computerized network;
    monitoring usage of a plurality of display items on a plurality of different computerized devices operated by a plurality of different users to gather group usage statistics relating to said display items, said usage of said display items comprising marketing message adjustment data received from said users when said users have said two-way communication conversation with said purveyor computerized device through said display item;
    receiving, by said customer computerized device, a second data feed from said purveyor computerized device by way of said computerized network, said second data feed being different than said first data feed, said second data feed being customized for said customer based on said group usage statistics and said customer interaction information, said second data feed comprising a customized template creating a customized instance of said display item on said graphic user interface,
    said customized template comprising a default template altered with said group usage statistics and said customer interaction information, said group usage statistics and said customer interaction information causing each said customized template to be personalized for each said customer, and each said customized template providing that different data goes to different customers; and
    updating said display item by displaying said second data feed through said display item, said second data feed causing said display item to have an appearance of a different display item that produces a higher return on investment relative to said first data feed, based on said group usage statistics.

7. The method according to claim 6, further comprising, before displaying said marketing display item, installing a platform independent application within memory of said customer computerized device, said platform independent application executing instructions through a processor of said customer computerized device to cause said graphic user interface to display said marketing display item.

8. The method according to claim 7, further comprising distributing, by said customer and said purveyor, said platform independent application to a plurality of customer computerized devices operated by a plurality of customers through web pages, e-mail, instant messaging, text messaging, and social networks.

9. The method according to claim 6, said instance of said marketing display item being based on one of a plurality of pre-established, configurable templates, said method further comprising establishing one of many parent marketing display items using one or more of said templates, one parent marketing display item being created for each different marketing campaign.

10. The method according to claim 9, further comprising, monitoring development of said parent marketing display items to calculate return on investment values for each said different marketing campaign.

11. A tangible computer program storage medium embodying a computer program comprising instructions executable by a computer to perform a method comprising:
    displaying a display item on a graphic user interface of a customer computerized device;
    receiving, by said customer computerized device, a first data feed from at least one third-party computerized device by way of a computerized network connected to said customer computerized device, said first data feed being displayed through said display item;
    receiving, by said graphic user interface, customer interaction information when a customer interacts with said display item, said customer interaction information comprising marketing message adjustment data received when said customer has a two-way communication conversation with said third-party computerized device through said display item;
    transmitting said customer interaction information to said third-party computerized device by way of said computerized network;
    monitoring usage of a plurality of display items on a plurality of different computerized devices operated by a plurality of different users to gather group usage statistics relating to said display items, said usage of said display items comprising marketing message adjustment data received from said users when said users have said two-way communication conversation with said third-party computerized device through said display item;
    receiving, by said customer computerized device, a second data feed from said third-party computerized device by way of said computerized network, said second data feed being customized for said customer based on said group usage statistics and said customer interaction information, said second data feed comprising a customized template creating a customized instance of said display item on said graphic user interface, said customized template comprising a default template altered with said group usage statistics and said customer interaction information, said group usage statistics and said customer interaction information causing each said customized template to be personalized for each said customer, and each said customized template providing that different data goes to different customers; and
    updating said display item by displaying said second data feed through said display item, said second data feed causing said display item to have an appearance of a different display item that produces a higher return on investment relative to said first data feed, based on said group usage statistics.

12. The tangible computer program storage medium according to claim 11, said method further comprising, before displaying said display item, installing a platform independent application within memory of said customer computerized device, said platform independent application executing instructions through a processor of said customer computerized device to cause said graphic user interface to display said display item.

13. The tangible computer program storage medium according to claim 12, said method further comprising distributing, by said customer and said third-party, said platform independent application to a plurality of customer computerized devices operated by a plurality of customers through web pages, e-mail, instant messaging, text messaging, and social networks.

14. The tangible computer program storage medium according to claim 11, an instance of said display item being based on one of a plurality of pre-established, configurable templates, said method further comprising establishing one of many parent display items using one or more of said templates, one parent display item being created for each different marketing campaign.

15. The tangible computer program storage medium according to claim 14, further comprising, monitoring development of said parent display items to calculate return on investment values for each said different marketing campaign.

* * * * *